United States Patent
Xu (12) 
(10) Patent No.: US 10,318,042 B2
(45) Date of Patent: Jun. 11, 2019

(54) CONTROLLING METHOD OF FOLDABLE SCREEN AND ELECTRONIC DEVICE

(71) Applicant: Lenovo (Beijing) Co., Ltd., Beijing (CN)

(72) Inventor: Ben Xu, Beijing (CN)

(73) Assignee: LENOVO (BEIJING) CO., LTD., Haidian District, Beijing (CN)

(*) Notice: Subject to any disclaimer, the term of this patent is extended or adjusted under 35 U.S.C. 154(b) by 176 days.

(21) Appl. No.: 14/711,082

(22) Filed: May 13, 2015

(65) Prior Publication Data

US 2016/0188079 A1    Jun. 30, 2016

(30) Foreign Application Priority Data

Dec. 25, 2014   (CN) .......................... 2014 1 0823027

(51) Int. Cl.
  *G06F 3/041*  (2006.01)
  *G06F 1/16*   (2006.01)
  *G06F 3/01*   (2006.01)

(52) U.S. Cl.
  CPC .......... *G06F 3/0416* (2013.01); *G06F 1/1652* (2013.01); *G06F 3/016* (2013.01); *G06F 3/0418* (2013.01); *G06F 2203/04102* (2013.01)

(58) Field of Classification Search
  CPC .......... G06F 3/041; G06F 3/044; G06F 3/016; G06F 3/047
  See application file for complete search history.

(56) References Cited

U.S. PATENT DOCUMENTS

| 9,110,580 B2 * | 8/2015 | Richardson ........... G06F 3/0488 |
| 2008/0291225 A1 * | 11/2008 | Arneson ................. G06F 3/011 |
| | | 345/698 |
| 2010/0117975 A1 * | 5/2010 | Cho ....................... G06F 1/1626 |
| | | 345/173 |

* cited by examiner

*Primary Examiner* — Olga V Merkoulova
(74) *Attorney, Agent, or Firm* — Brinks Gilson & Lione; John C. Freeman (57) ABSTRACT

A controlling method of a touchable and foldable screen and an electronic device are described. The method includes detecting a first touch operation when the foldable screen is in a bent state; judging whether the first touch operation is located in a bent region on the foldable screen; and adjusting a first bent region on the foldable screen to which the first touch operation is mapped from the bent state to a non-bent state in case that the first touch operation is located in the bent region on the foldable screen.

6 Claims, 4 Drawing Sheets

CONTROLLING METHOD OF FOLDABLE SCREEN AND ELECTRONIC DEVICE

This application claims priority to Chinese patent application No. 201410823027.0 filed on Dec. 25, 2014, the entire contents of which are incorporated herein by reference.

The present disclosure relates to a field of electronic technique, in particular to a controlling method of a foldable screen and an electronic device.

BACKGROUND

As electronic technique develops rapidly, portable mobile devices such as a smart phone and a tablet computer and the like changes people's life and way of working greatly. At present, screens of most smart phones are squared panels. As a flexible and foldable screen appears, a smart phone with a bendable screen has entered into people's life. In future, the mobile devices and wearable devices may be equipped with a flexible and foldable screen, and a user can wind directly the mobile device around his/her wrist, or even roll the mobile phone like a paper.

However, when the flexible and foldable screen is bent into a curved surface, upon touching the display screen by the user, screen region touched by a finger will become larger at a concave position of the screen while become smaller at a convex position of the screen. As a result, it is easy to touch a wrong position or touch a plurality of points simultaneously, or it is easy to occur that the mobile device will identify the touch as a screen touch of a palm instead of a screen touch of a finger or fingers, so as to trigger a corresponding operation, which may cause trouble for the user.

Thus it can be seen that there is a technical problem in the prior art that a touchable, flexible and foldable screen has a low accuracy in detection of the user's touch operation.

SUMMARY

Embodiments of the present disclosure provide a controlling method of a foldable screen and an electronic device, which are used to solve the technical problem in the prior art that a touchable, flexible and foldable screen has a low accuracy in detection of the user's touch operation.

According to one aspect of the present disclosure, there is provided a controlling method of a touchable and foldable screen. The method comprises steps of: detecting a first touch operation when the foldable screen is in a bent state; judging whether the first touch operation is located in a bent region on the foldable screen; and adjusting a first bent region on the foldable screen to which the first touch operation is mapped from the bent state to a non-bent state in case that the first touch operation is located in the bent region on the foldable screen.

Optionally, the judging whether the first touch operation is located in a bent region on the foldable screen comprises in particular: obtaining a plurality of touch points corresponding to the first touch operation on the foldable screen; and judging whether the first touch operation is located in the bent region by judging whether at least one of the plurality of touch points is located in the bent region.

Optionally, the adjusting a first bent region in the foldable screen to which the first touch operation is mapped from the bent state to a non-bent state comprises in particular: determining the first bent region on the foldable screen according to a plurality of position coordinates of the plurality of touch points; and adjusting the first bent region from the bent state to the non-bent state.

Optionally, the determining the first bent region on the foldable screen according to a plurality of position coordinates of the plurality of touch points comprises in particular: obtaining a maximum distance between two adjacent position coordinates and determining a predetermined threshold distance greater than the maximum distance; and determining at least one point whose distance from one of the two adjacent position coordinates, the distance between which is the maximum distance, is smaller than the predetermined threshold distance on the foldable screen, the at least one point and the two adjacent position coordinates constituting the first bent region.

Optionally, after adjusting a first bent region on the foldable screen to which the first touch operation is mapped from the bent state to a non-bent state, the method further comprises: detecting whether a first touch operation is located in the first bent region; and adjusting the first bent region from the non-bent state to the bent state if there is no first touch operation in the first bent region.

According to another aspect of the present disclosure, there is further provided an electronic device having a touchable and foldable screen, comprising: a detecting unit configured to detect a first touch operation when the foldable screen is in a bent state; a judging unit configured to judge whether the first touch operation is located in a bent region on the foldable screen; and a screen state controlling unit configured to adjust a first bent region on the foldable screen to which the first touch operation is mapped from the bent state to a non-bent state in case that the first touch operation is located in the bent region.

Optionally, the judging unit comprises in particular: a touch point obtaining sub-unit configured to obtain a plurality of touch points corresponding to the first touch operation on the foldable screen; and a touch point judging sub-unit configured to judge whether the first touch operation is located in the bent region by judging whether at least one of the plurality of touch points is located in the bent region.

Optionally, the screen state controlling unit comprises in particular: a first bent region determining sub-unit configured to determine the first bent region on the foldable screen according to a plurality of position coordinates of the plurality of touch points; and a first screen state controlling sub-unit configured to adjust the first bent region from the bent state to the non-bent state.

Optionally, the first bent region determining sub-unit is in particular configured to: obtain a maximum distance between two adjacent position coordinates and determine a predetermined threshold distance greater than the maximum distance; and determine at least one point whose distance from one of the two adjacent position coordinates, the distance between which is the maximum distance, is smaller than the predetermined threshold distance on the foldable screen, wherein the at least one point and the two adjacent position coordinates constitute the first bent region.

Optionally, the screen state controlling unit further comprises: a second screen state controlling sub-unit configured to detect whether there is a first touch operation in the first bent region after adjusting the first bent region on the foldable screen to which the first touch operation is mapped from the bent state to the non-bent state; and adjust the first bent region from the non-bent state to the bent state if there is no first touch operation in the first bent region.

The above one or more technical solutions in the embodiments of the present disclosure have at least the following one or more technical effects: the technical problem in the prior art that a touchable, flexible and foldable screen has a low accuracy in detection of the user's touch operation can be eliminated by detecting the touch operation of the user when the foldable screen is in the bent state and adjusting a first bent region on the foldable screen to which the first touch operation is mapped from the bent state to a non-bent state in case that the touch operation of the user is located in the bent region on the foldable screen, so as to achieve the technical effect that the touchable, flexible and foldable screen detects the touch operation of the user accurately.

DETAILED DESCRIPTION

In the technical solution provided in embodiments of the present disclosure, when a foldable screen is in a bent state, the technical problem in the prior art that the touchable, flexible and foldable screen has a low accuracy in detection of the user's touch operation is eliminated by adjusting a touch region touched by a user from the bent state to a non-bent state and then re-detecting a touch operation of the user, thereby achieving the technical effect that the touchable, flexible and foldable screen detects the touch operation of the user accurately.

The term "and/or" in the present disclosure describes just an association relationship of associated objects, and indicates that there can be three relationships, for example, A and/or B can represent the following three cases: only A exists, A and B exists simultaneously, and only B exists. In addition, the symbol "/" in the present disclosure generally represent that the associated objects before and after the symbol "/" have a relationship of "or".

Major implementation principles, specific implementations and beneficial effects to be achieved of the technical solution in the embodiments of the present disclosure will be described below in detail with reference to the accompanying figures.

First Embodiment

In the first embodiment of the present disclosure, there is provided a controlling method of a foldable screen applicable to an electronic device. The electronic device may be a smart phone, a table computer and a wearable device and so on. The electronic device has a touchable and foldable screen. In particular, the foldable screen means that a display screen of a mobile device can be bent and folded. In addition, the solution in the embodiment of the present disclosure can be applied also to a mobile device having a flexible display screen, on which the present disclosure does not make any limitation.

Figure 1:
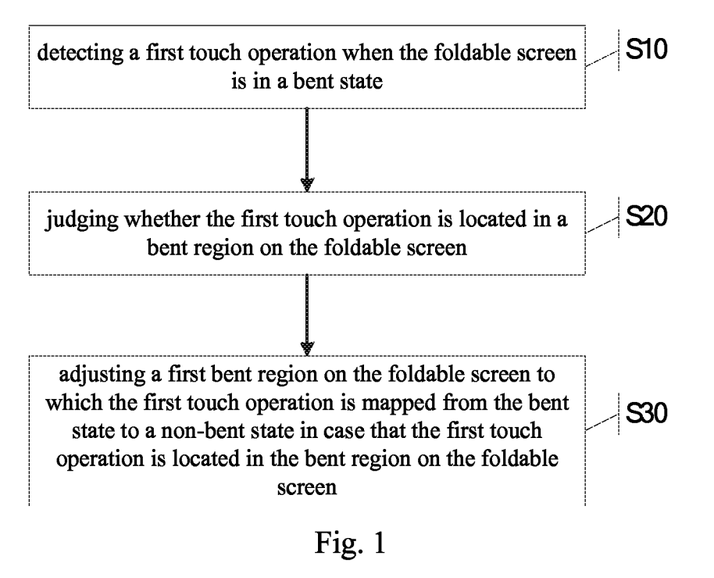
FIG. 1 is a method flow chart of a controlling method of a foldable screen in a first embodiment of the present disclosure.

As shown in FIG. 1, the method comprises: detecting a first touch operation when the foldable screen is in a bent state (S10); judging whether the first touch operation is located in a bent region on the foldable screen (S20); and adjusting a first bent region on the foldable screen to which the first touch operation is mapped from the bent state to a non-bent state in case that the first touch operation is located in the bent region on the foldable screen (S30).

Next, the above solution is initially described from a viewpoint of human-machine interaction.

First, the electronic device executes step S10. When the foldable screen of the electronic device is in a bent state, the electronic device detects a first touch operation that the user touches the foldable screen.

After detecting the first touch operation, the electronic device enters into step S20 to judge whether the first touch operation is located in a bent region on the foldable screen. In case that the first touch operation is not located in the bent region but located in a non-bent region, data generated by the first touch operation is directly sent to a processing system of the electronic device and a response is made to the first touch operation.

In case that the first touch operation is located in the bent region on the foldable screen, the electronic device will enter into step S30 to adjust a first bent region on the foldable screen to which the first touch operation is mapped from the bent state to a non-bent state.

Last, after the electronic device adjusts the first bent region to the non-bent state, the electronic device will redetect the first touch operation and obtain touch data generated by the first touch operation on the first bent region, and the touch data is sent to the processing system of the electronic device and a response is made to the first touch operation.

After knowing preliminary the controlling method of the foldable screen provided in the embodiment of the present disclosure through the above examples, the specific implementation steps of the method provided in the embodiment of the present disclosure will be described below in detail.

First, step S10 is executed, that is, a first touch operation of the user is detected when the foldable screen is in a bent state.

In particular, the touch operation of the user may be a touch operation of one or more fingers on the screen, or may be a touch operation of a palm on the screen, or may be a touch operation of a touch pen used by the user on the screen, to which the present disclosure does not make any limitation.

Then, after detecting the first touch operation, the electronic device enters into step S20, that is, it is judged whether the first touch operation is located in a bent region on the foldable screen.

In the step S20, first, the electronic device needs to obtain region positions of the bent region and a non-bent region on the foldable screen.

In particular, the electronic device can detect and obtain pressure values of the bent region and the non-bent region on the foldable screen through a piezoelectric device. For example, for a detection point, when the foldable screen is in the non-bent state, the piezoelectric device detects that the pressure value at this detection point is a first pressure value; when the foldable screen is in the bent state, the piezoelectric device detects that the pressure value at this detection point is a second pressure value. A pressure change value when the foldable screen is bent can be obtained according to the first pressure value and the second pressure value, and then a bending parameter of the foldable screen can be determined according to these pressure values, for example, a bending curvity of the foldable screen. Further, the electronic device determines the region positions of the bent region and the non-bent region on the foldable screen according to the position and pressure value of each detection point on the foldable screen.

In particular, the screen can be divided into small regions, and the size of a small region can be set according to actual requirements. For example, the screen is divided into a plurality of regions of 1 mm*1 mm (a square region with a side length of 1 mm), it is determined whether these small regions are in the bent state through the piezoelectric device, and a plurality of small regions in the bent state constitute the bent region on the foldable screen.

Then, the electronic device obtains positions of a plurality of touch points corresponding to the first touch operation on the foldable screen, and then judges whether the first touch operation is located in the bent region by judging whether at least one of the plurality of touch points is located in the bent region.

In particular, in case that the foldable screen is divided into a plurality of small regions of 1 mm*1 mm, the electronic device judges whether at least one of the plurality of touch points is located in the small regions being in the bent state after obtaining the plurality of touch points of the first touch operation. In the specific implementation, the plurality of touch points can either be located in a same small region or located in a plurality of different small regions.

Further, in case that at least one of the touch points is located in the small region being in the bent state, it is determined that the first touch operation is located in the bent region on the foldable screen.

In the embodiment of the present disclosure, after judging that the first touch operation is located in the bent region on the foldable screen, the electronic device enters into the step S30, that is, a first bent region on the foldable screen to which the first touch operation is mapped is adjusted from the bent state to a non-bent state.

In step S30, the electronic device maps the first touch operation to the first bent region on the foldable screen.

The electronic device determines the first bent region on the foldable screen according to a plurality of position coordinates of the plurality of touch points as determined in step S20.

In particular, the electronic device can obtain a maximum distance between two adjacent position coordinates and determine a predetermined threshold distance greater than the maximum distance, and determine at least one point whose distance from one of the two adjacent position coordinates, the distance between which is the maximum distance, is smaller than the predetermined threshold distance on the foldable screen. The at least one point and the two adjacent position coordinates constitute the first bent region. Thus, the determined first bent region is a connected region including all of the position coordinates of the at least one point and the two adjacent position coordinates.

For example, if the number of the obtained position coordinates is 2 and the distance between the two position coordinates is 20, then the electronic device needs to determine a predetermined threshold distance greater than 20, such as 30. Then, the first bent region including the two position coordinates determined by electronic device is: a circular region with a radius of 30 and with any one of the two coordinate positions as a center of circle. Next, the electronic device adjusts the first bent region from the bent state to the non-bent state.

In the embodiment of the present disclosure, assuming that the screen is divided into a plurality of small regions of 1 mm*1 mm, the circular region with a radius of 30 is firstly distributed on at least one of the small regions.

Then, the electronic device adjusts the at least one of the small regions from the bent state to the non-bent state.

In the embodiment of the present disclosure, adjusting of the screen state is described by taking force feedback devices distributed in each of the small regions as an example.

Given that 9*9 force feedback devices are distributed in one small region, when this small region is adjusted from the bent state to the non-bent state, the 9*9 force feedback devices are controlled to generate certain pressure, so that the small region is adjusted from the bent state to the non-bent state, that is, the small region changes from a bent region to a flat region.

In the specific implementation, the method for adjusting the screen state is also different for a foldable screen having a different material and structure, to which the present disclosure does not make any limitation.

Last, after adjusting the first bent region to the non-bent state, the electronic device will redetect the first touch operation and obtain touch data generated by the first touch operation in the first bent region. Then, the touch data is sent to the processing system of the electronic device, and a response is made to the first touch operation.

In the embodiment of the present application, after adjusting the first bent region from the bent state to the non-bent state, the method further comprises: detecting whether there is a first touch operation in the first bent region; and adjusting the first bent region from the non-bent state to the bent state if there is no first touch operation in the first bent region.

Figure 3A:
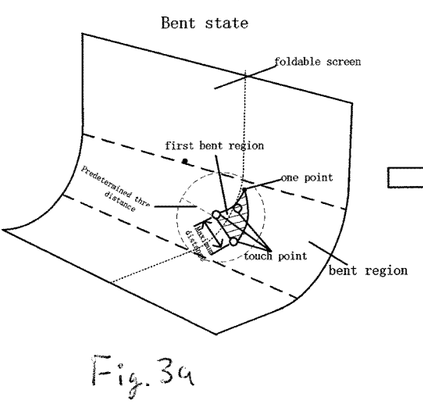
FIG. 3a shows an electronic device with a foldable screen in a bent state and FIG. 3b shows the electronic device with a foldable screen in a non-bent state.
Figure 3B:
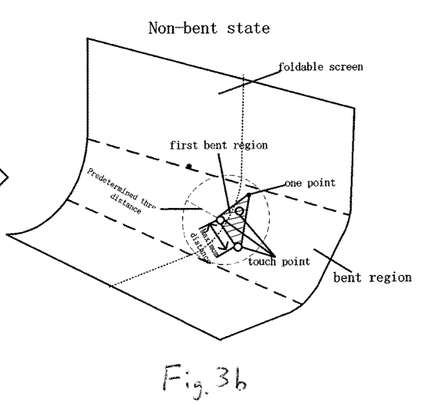

Referring now to FIGS. 3a and 3b, they schematically illustrate the electronic device having a foldable screen with three touch points. Note that the foldable screen shown is purely schematic in nature and in no way is to be viewed as limiting the shape or size of the foldable screen. FIGS. 3a and 3b are used to illustrate: 1) a bent region, 2) how to measure a "maximum distance," which could determine "a predetermined threshold distance," and 3) where is an "at least one point." The three hollow circles in the bent state of FIG. 3a and the non-bent state of FIG. 3b, respectively, are touch points. As shown FIG. 3a, when the first touch operation (at least one of the three touch points which corresponding to the first touch operation) is located in the bent region on the foldable screen, the first bent region (slash area) to which the first touch operation is mapped is adjusted from the bent state to the non-bent state, i.e., FIG. 3b. As shown in FIG. 3a, when the first bent region (slash area) is in a bent state, the first bent region is not totally contained within a planar area. As shown in FIG. 3b, when the first bent region (slash area) is in a non-bent state, the first bent region (slash area) is totally contained with a planar area.

The first bent region is determined according to a plurality of position coordinates of the plurality of touch points, and by obtaining a maximum distance (as shown in double arrows) between two adjacent position coordinates and determining a predetermined threshold distance greater than the maximum distance; and determining at least one point whose distance from one of the two adjacent position coordinates, the distance between which is the maximum distance, is smaller than the predetermined threshold distance on the foldable screen, the at least one point and the two adjacent position coordinates constituting the first bent region (triangular slash area).

Figure 4A:
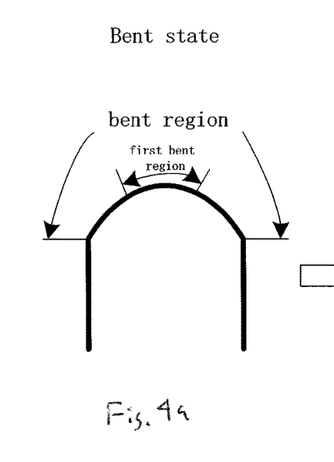
FIG. 4a is a cross-sectional view of the electronic device of FIG. 3a and FIG. 4b is a cross sectional view of the electronic device of FIG. 3b.
Figure 4B:
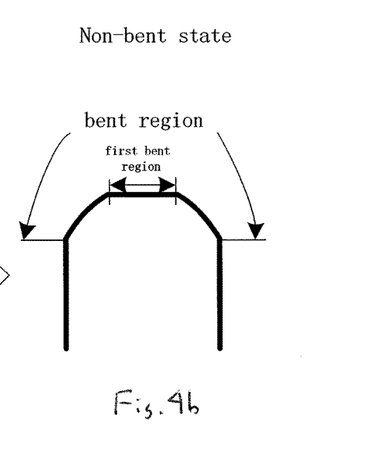

FIGS. 4a and 4b are cross-sectional views of FIGS. 3a and 3b, respectively and they illustrate adjusting a first bent region on the foldable screen to which the first touch operation is mapped from the bent state to a non-bent state in case that the first touch operation is located in the bent region on the foldable screen. The first bent region in the bent state is curved as show in FIG. 4a, while the first bent region in non-bent state is straight as shown in FIG. 4b.

Figure 5A:
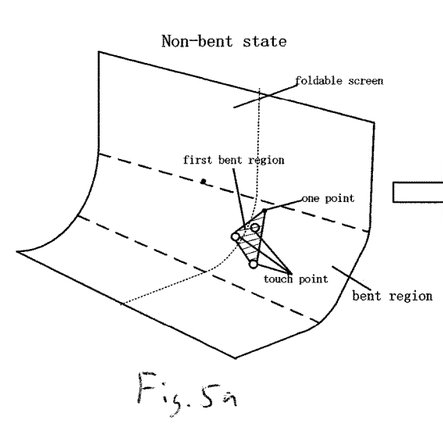
FIG. 5a shows an electronic device with a foldable screen in a non-bent state and FIG. 5b shows the electronic device with a foldable screen in a bent state.
Figure 5B:
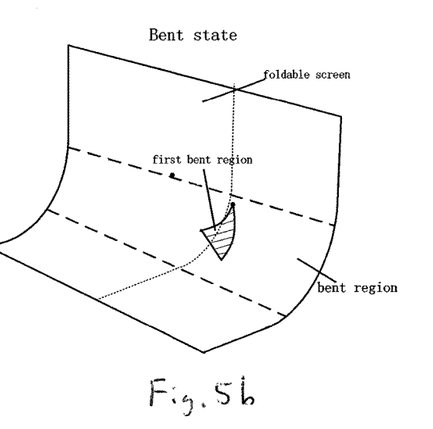

FIG. 5a illustrates the electronic device having a foldable screen that is in a non-bent state and FIG. 5b illustrates the electronic device having a foldable screen that is in a bent state when there is no first touch operation in the first bent region. As shown in FIG. 5a, the three touch points still exist on the foldable screen and the first bent region is in the non-bent state. However, as shown in FIG. 5b, when the three touch points do not exist on the foldable screen, the first bent region will adjusted back to the bent state.

Figure 6A:
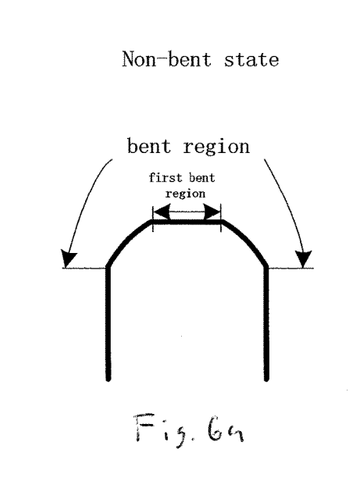
FIG. 6a is a cross-sectional view of the electronic device of FIG. 5a and FIG. 6b is a cross sectional view of the electronic device of FIG. 5b.
Figure 6B:
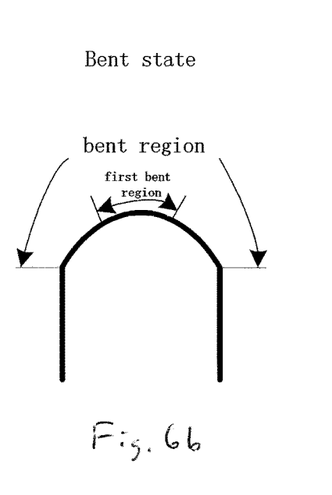

FIG. 6a is a cross-sectional view of FIG. 5a and FIG. 6b is a cross-sectional view of FIG. 5b. FIG. 6a illustrates that the first bent region is in a non-bent state and is straight, while FIG. 6b illustrates that the first bent region is in a bent state and is curved.

For example, when the user touches the screen by a finger, there is no touch operation in the first bent region after the finger of the user are raised. Now, the electronic device adjusts the first bent region from the non-bent state to the bent state.

Second Embodiment

Figure 2:
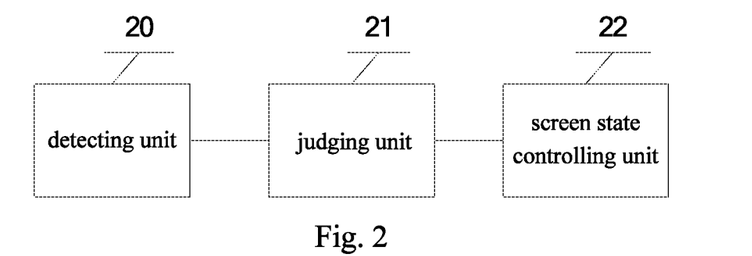
FIG. 2 is a block diagram of a structure of an electronic device in a second embodiment of the present disclosure.

Based on the same inventive concept, in this embodiment of the present disclosure, there is further provided an electronic device corresponding to the controlling method of the foldable screen in the first embodiment. The electronic device has a touchable and foldable screen. As shown in FIG. 2, the electronic device comprises a detecting unit 20, a judging unit 21 and a screen state controlling unit 22. The detecting unit 20 is configured to detect a first touch operation when the foldable screen is in a bent state.

Optionally, the specific implementation comprises: the touch operation of the user may be a touch operation of one or more fingers on the screen, or may be a touch operation of a palm on the screen, or may be a touch operation of a touch pen used by the user on the screen, to which the present disclosure does not make any limitation.

The judging unit 21 is configured to judge whether the first touch operation is located in a bent region on the foldable screen.

Optionally, first, the electronic device needs to obtain region positions of the bent region and a non-bent region on the foldable screen.

In particular, the electronic device can detect and obtain pressure values of the bent region and the non-bent region on the foldable screen through a piezoelectric device. For example, for a detection point, when the foldable screen is in the non-bent state, the piezoelectric device detects that the pressure value at this detection point is a first pressure value; when the foldable screen is in the bent state, the piezoelectric device detects that the pressure value at this detection point is a second pressure value. A pressure change value when the foldable screen is bent can be obtained according to the first pressure value and the second pressure value, and then a bending parameter of the foldable screen can be determined according to these pressure values, for example, a bending curvity of the foldable screen. Further, the electronic device determines the region positions of the bent region and the non-bent region on the foldable screen according to the position and pressure value of each detection point on the foldable screen.

In particular, the screen can be divided into small regions, and the size of a small region can be set according to actual requirements. For example, the screen is divided into a plurality of regions of 1 mm*1 mm (a square region with a side length of 1 mm), it is determined whether these small regions are in the bent state through the piezoelectric device, and a plurality of small regions in the bent state constitute the bent region on the foldable screen.

Optionally, the electronic device obtains positions of a plurality of touch points corresponding to the first touch operation on the foldable screen, and then judges whether the first touch operation is located in the bent region by judging whether at least one of the plurality of touch points is located in the bent region.

In particular, in case that the foldable screen is divided into a plurality of small regions of 1 mm*1 mm, the electronic device judges whether at least one of the plurality of touch points is located in the small regions being in the bent state after obtaining the plurality of touch points of the first touch operation. In the specific implementation, the plurality of touch points can either be located in a same small region or located in a plurality of different small regions.

Further, in case that at least one of the touch points is located in the small region being in the bent state, it is determined that the first touch operation is located in the bent region on the foldable screen.

The screen state controlling unit 22 is configured to adjust a first bent region on the foldable screen to which the first touch operation is mapped from the bent state to a non-bent state in case that the first touch operation is located in the bent region on the foldable screen.

The first bent region on the foldable screen is determined according to a plurality of position coordinates of the plurality of touch points.

In particular, the electronic device can obtain a maximum distance between two adjacent position coordinates and determine a predetermined threshold distance greater than the maximum distance, and determine at least one point whose distance from one of the two adjacent position coordinates, the distance between which is the maximum distance, is smaller than the predetermined threshold distance on the foldable screen. The at least one point and the two adjacent position coordinates constitute the first bent region. Thus, the determined first bent region is a connected region including all of the position coordinates of the at least one point and the two adjacent position coordinates.

For example, if the number of the obtained position coordinates is 2 and the distance between the two position coordinates is 20, then the electronic device needs to determine a predetermined threshold distance greater than 20, such as 30. Then, the first bent region including the two position coordinates determined by electronic device is: a circular region with a radius of 30 and with any one of the two coordinate positions as a center of circle. Next, the electronic device adjusts the first bent region from the bent state to the non-bent state.

In the embodiment of the present disclosure, assuming that the screen is divided into a plurality of small regions of 1 mm*1 mm, the circular region with a radius of 30 is firstly distributed on at least one of the small regions.

Then, the electronic device adjusts the at least one of the small regions from the bent state to the non-bent state.

In the embodiment of the present disclosure, adjusting of the screen state is described by taking force feedback devices distributed in each of the small regions as an example.

Given that 9*9 force feedback devices are distributed in one small region, when this small region is adjusted from the bent state to the non-bent state, the 9*9 force feedback devices are controlled to generate certain pressure, so that the small region adjusts from the bent state to the non-bent state, that is, the small region changes from a bent region to a flat region.

In the specific implementation, the method for adjusting the screen state is also different for a foldable screen having a different material and structure, to which the present disclosure does not make any limitation.

Figure 7:
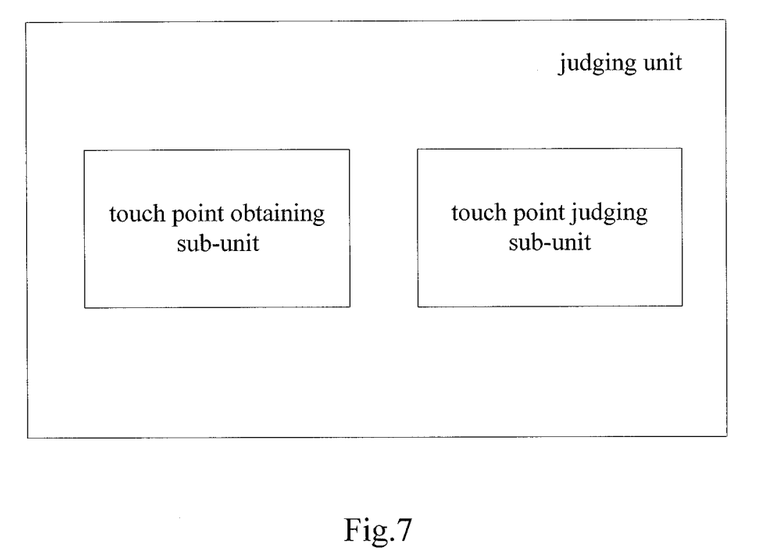
FIG. 7 illustrates the judging unit having a touch point obtaining sub-unit and a touch point judging sub-unit.

Optionally, the judging unit 21 comprises in particular: a touch point obtaining sub-unit configured to obtain a plurality of touch points corresponding to the first touch operation on the foldable screen; and a touch point judging sub-unit configured to judge whether the first touch operation is located in the bent region by judging whether at least one of the plurality of touch points is located in the bent region.

Figure 8:
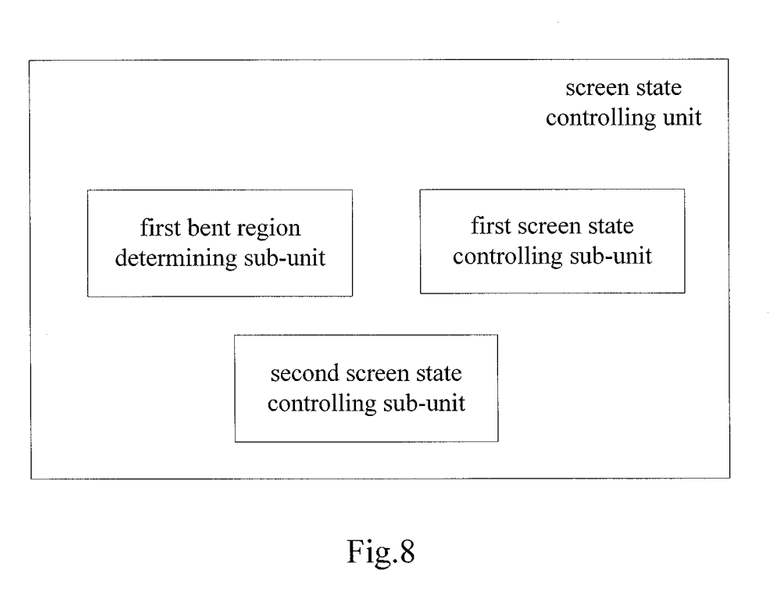
FIG. 8 illustrates the screen state controlling unit with a first bent region determining sub-unit, first screen state controlling sub-unit, and a second screen state controlling sub-unit.

Optionally, the screen state controlling unit 22 comprises in particular: a first bent region determining sub-unit configured to determine the first bent region on the foldable screen according to a plurality of position coordinates of the plurality of touch points; and a first screen state controlling sub-unit configured to adjust the first bent region from the bent state to the non-bent state.

Optionally, the first bent region determining sub-unit is in particular configured to: obtain a maximum distance between two adjacent position coordinates and determine a predetermined threshold distance greater than the maximum distance; and determine at least one point whose distance from one of the two adjacent position coordinates, the distance between which is the maximum distance, is smaller than the predetermined threshold distance on the foldable screen. The at least one point and the two adjacent position coordinates constitute the first bent region.

Optionally, the screen state control unit 22 further comprises: a second screen state controlling sub-unit configured to detect whether there is a first touch operation in the first bent region after adjusting the first bent region on the foldable screen to which the first touch operation is mapped from the bent state to the non-bent state; and adjust the first bent region from the non-bent state to the bent state if there is no first touch operation in the first bent region.

The above one or more technical solutions in the embodiments of the present disclosure can achieve at least the following one or more technical effects: the technical problem in the prior art that a touchable, flexible and foldable screen has a low accuracy in detection of the user's touch operation can be eliminated by detecting the touch operation of the user when the foldable screen is in the bent state and adjusting the first bent region in which the touch operation of the user is mapped to the foldable screen from the bent state to the non-bent state if the touch operation of the user is located in the bent region on the foldable screen, so as to achieve the technical effect that the touchable, flexible and foldable screen detects the touch operation of the user accurately.

Those skilled in the art shall understand that the embodiment of the present disclosure be provided as a method, a system or a computer program product. Therefore, the present disclosure can adopt a complete hardware embodiment, a complete software embodiment, or a form of an embodiment combining the software and the hardware. Furthermore, the present disclosure can adopt a form of a computer program product implanted on one or more computer-available storage media comprising a computer-available program code (including but not limited to a magnetic disc memory, CD-ROM, an optical memory and the like).

The present disclosure is described by referring to flow charts and/or block diagrams of the method, the device (system) and the computer program product according to the embodiments of the present disclosure. It shall be understood that each flow and/or block of the flow charts and/or block diagrams and a combination of flows and/or blocks in the flow charts and/or block diagrams can be implemented by computer program instructions. These computer program instructions can be provided to a processor of a general computer, a special computer, an embedded processing machine or other programmable data processing device, so as to produce a machine, so that instructions executed by the processor of the computer or other programmable data processing device produce an apparatus configured to realize functions prescribed in one or more flows of the flow charts and/or one or more blocks of the block diagrams.

These computer program instructions can be stored also in a computer readable memory that is capable of leading the computer or other programmable data processing device to operate in a specific manner, so that the instructions stored in the computer readable memory produce manufactures including an instruction apparatus. This instruction apparatus realizes the function prescribed in one or more flows of the flow charts and/or one or more blocks of the block diagrams.

These computer program instructions can also be loaded to the computer or other programmable data processing device, so that a series of operation steps are executed on the computer or other programmable device to produce the processing implemented by the computer. Thus, the instructions executed on the computer or other programmable device provide steps for realizing the functions prescribed in one or more flows of the flow charts and/or one or more blocks of the block diagrams.

In particular, the computer program instruction corresponding to the controlling method of the foldable screen in the embodiment of the present application can be stored in storage media such as an optical disk, hardware and a USB disk and the like. When the computer program instruction corresponding to the controlling method of the foldable screen that is stored in the storage media is read or executed by an electronic device, following steps are performed: detecting a first touch operation when the foldable screen is in a bent state; judging whether the first touch operation is located in a bent region on the foldable screen; and adjusting a first bent region on the foldable screen to which the first touch operation is mapped from the bent state to a non-bent state in case that the first touch operation is located in the bent region on the foldable screen.

Optionally, in the specific implementation process, when a computer instruction corresponding to the step of judging whether the first touch operation is located in a bent region on the foldable screen that is stored in the storage medium is executed, in particular, following steps are performed: obtaining a plurality of touch points corresponding to the first touch operation on the foldable screen; and judging whether the first touch operation is located in the bent region by judging whether at least one of the plurality of touch points is located in the bent region.

Optionally, in the specific implementation process, when a computer instruction corresponding to the step of adjusting a first bent region in the foldable screen to which the first touch operation is mapped from the bent state to a non-bent state that is stored in the storage medium is executed, in particular, following steps are performed: determining the first bent region on the foldable screen according to a plurality of position coordinates of the plurality of touch points; and adjusting the first bent region from the bent state to the non-bent state.

Optionally, in the specific implementation process, when a computer instruction corresponding to the step of determining the first bent region on the foldable screen according to a plurality of position coordinates of the plurality of touch points that is stored in the storage medium is executed, in particular, following steps are performed: obtaining a maximum distance between two adjacent position coordinates and determining a predetermined threshold distance greater than the maximum distance; and determining at least one point whose distance from one of the two adjacent position coordinates, the distance between which is the maximum distance, is smaller than the predetermined threshold distance on the foldable screen, the at least one point and the two adjacent position coordinates constituting the first bent region.

Optionally, other computer instructions are stored in the storage medium. These computer instructions are executed after the computer instruction corresponding to the step of adjusting a first bent region on the foldable screen to which the first touch operation is mapped from the bent state to a non-bent state is executed. When these steps are executed, following steps are performed: detecting whether a first touch operation is located in the first bent region; and adjusting the first bent region from the non-bent state to the bent state if there is no first touch operation in the first bent region.

Although the preferable embodiments of the present disclosure have been already described, those skilled in the art can make additional alternations and amendments to these embodiments once knowing a basic concept of the inventive step. Therefore, the claims intend to be explained as comprising the preferable embodiments as well as all the alternations and amendments that fall into the scope of the present disclosure.

Obviously, those skilled in the art can make various alternations and modifications to the present disclosure without departing the spirit and scope of the present disclosure. As such, if these alternations and modifications of the present disclosure fall into the scope of the claims of the present disclosure as well as the equivalent technique thereof, then the present disclosure intends to include these alternations and modifications.

The invention claimed is:

1. A controlling method of a touchable and foldable screen comprising:
   detecting a first touch operation when the foldable screen is in a bent state;
   judging whether the first touch operation is located in a bent region on the foldable screen; and
   adjusting a first bent region of the bent region on the foldable screen to which the first touch operation is mapped from the bent state to a non-bent state in case that the first touch operation is located in the bent region on the foldable screen,
   wherein the adjusting the first bent region in the foldable screen to which the first touch operation is mapped from the bent state to a non-bent state comprises determining the first bent region on the foldable screen according to a plurality of position coordinates of a plurality of touch points and adjusting the first bent region from the bent state to the non-bent state; and
   wherein the judging whether the first touch operation is located in a bent region on the foldable screen comprises:
      obtaining the plurality of touch points, which correspond to the first touch operation on the foldable screen; and
      judging whether the first touch operation is located in the bent region by judging whether at least one of the plurality of touch points is located in the bent region.

2. The controlling method according to claim 1, wherein the determining the first bent region on the foldable screen according to the plurality of position coordinates of the plurality of touch points comprises:
   obtaining a maximum distance between two adjacent position coordinates of the plurality of position coordinates and determining a predetermined threshold distance greater than the maximum distance; and
   determining at least one point whose distance from one of the two adjacent position coordinates, the distance between which is the maximum distance, is smaller than the predetermined threshold distance on the foldable screen, the at least one point and the two adjacent position coordinates constituting the first bent region.

3. The controlling method according to claim 1, wherein after adjusting the first bent region on the foldable screen to which the first touch operation is mapped from the bent state to the non-bent state, the controlling method further comprises:
   detecting whether there is a first touch operation in the first bent region; and
   adjusting the first bent region from the non-bent state to the bent state if there is no first touch operation in the first bent region.

4. An electronic device having a touchable and foldable screen, comprising:
   a detecting unit configured to detect a first touch operation when the foldable screen is in a bent state;
   a judging unit configured to judge whether the first touch operation is located in a bent region on the foldable screen; and
   a screen state controlling unit configured to adjust a first bent region of the bent region on the foldable screen to which the first touch operation is mapped from the bent state to a non-bent state in case that the first touch operation is located in the bent region,
   wherein the screen state controlling unit comprises a first bent region determining sub-unit configured to determine the first bent region on the foldable screen according to a plurality of position coordinates of a plurality of touch points and a first screen state controlling sub-unit configured to adjust the first bent region from the bent state to the non-bent state; and wherein the judging unit comprises:
- a touch point obtaining sub-unit configured to obtain the plurality of touch points, which correspond to the first touch operation on the foldable screen; and
- a touch point judging sub-unit configured to judge whether the first touch operation is located in the bent region by judging whether at least one of the plurality of touch points is located in the bent region.

5. The electronic device according to claim 4, wherein the first bent region determining sub-unit is configured to:
- obtain a maximum distance between two adjacent position coordinates of the plurality of position coordinates and determine a predetermined threshold distance greater than the maximum distance; and
- determine at least one point whose distance from one of the two adjacent position coordinates, the distance between which is the maximum distance, is smaller than the predetermined threshold distance on the foldable screen, wherein the at least one point and the two adjacent position coordinates constitute the first bent region.

6. The electronic device according to claim 4, wherein the screen state control unit further comprises a second screen state controlling sub-unit configured to detect whether there is a first touch operation in the first bent region after adjusting the first bent region on the foldable screen to which the first touch operation is mapped from the bent state to the non-bent state; and adjust the first bent region from the non-bent state to the bent state if there is no first touch operation in the first bent region.

* * * * *